United States Patent [19]

Augier

[11] Patent Number: 5,507,333
[45] Date of Patent: Apr. 16, 1996

[54] COMPOSITE WHEEL

[75] Inventor: Pierre J. Augier, Grosse Pointe, Mich.

[73] Assignee: TRINC, Tire & Rim, Incorporated, Grosse Pointe, Mich.

[21] Appl. No.: 200,064

[22] Filed: Feb. 22, 1994

[51] Int. Cl.⁶ .................................................. B60B 25/22
[52] U.S. Cl. ................... 152/379.3; 152/381.4; 301/5.21
[58] Field of Search .............. 301/95–98, 6.91, 301/5.21; 152/375, 379.3, 379.4, 379.5, 381.3, 381.4, 384, 391, 393, 394, 402, 403, 404, 405; 295/7

[56] References Cited

U.S. PATENT DOCUMENTS

| | | | |
|---|---|---|---|
| 974,549 | 11/1910 | Bryant et al. | 295/7 |
| 1,687,330 | 10/1928 | Fitch | 152/394 X |
| 1,817,356 | 8/1931 | Fisher | 152/394 X |
| 2,145,343 | 1/1939 | Dempsey | 295/7 X |
| 2,709,471 | 5/1955 | Smith et al. | 152/393 X |
| 2,996,096 | 8/1961 | Powers | 152/352 |
| 3,117,614 | 1/1964 | Amici | 152/363 |
| 4,164,358 | 8/1979 | Entrup | 301/36 |
| 4,218,097 | 8/1980 | Olinger et al. | 301/5.21 |
| 4,351,382 | 9/1982 | Corner et al. | 152/330 |
| 4,373,567 | 2/1983 | Declercq | 152/405 |
| 4,393,913 | 7/1983 | Grawey et al. | 152/364 |
| 4,422,490 | 12/1983 | Power | 152/394 |
| 4,434,864 | 3/1984 | Lupo | 180/6.2 |
| 4,561,482 | 12/1985 | Tavazza et al. | 152/381.4 |
| 4,658,876 | 4/1987 | Augier | 152/405 X |
| 4,720,149 | 1/1988 | Thissen et al. | 301/5 |
| 4,878,527 | 11/1989 | Noma | 152/379.3 |
| 4,969,692 | 11/1990 | Yung | 301/5.21 |
| 5,022,718 | 6/1991 | Diekevers | 295/7 X |
| 5,232,032 | 8/1993 | Diernaz | 152/381.4 X |
| 5,232,033 | 8/1993 | Durif | 152/379.3 X |
| 5,232,034 | 8/1993 | Gergele | 152/394 |

FOREIGN PATENT DOCUMENTS 2456419  8/1976  Germany ................... 152/381.3

*Primary Examiner*—Russell D. Stormer
*Attorney, Agent, or Firm*—David J. Simonelli

[57] ABSTRACT

A composite wheel (20) including two tire bead retention members (38,40). The tire bead retention members (38,40) are compressible eliminating the requirement of a well in the drum skirt (34). Anti-roll-off humps (50,52) prevent the tire beads (24) of the tire (26) from rolling away from the tire bead retention members (38,40). The anti-roll-off humps (50,52) are retractable allowing the tire beads (24) to pass thereover when mounting the tire (26) to the wheel (20). Locking interconnectors (62,64) are used to hold the anti-roll-off humps (50,52) in the retracted position while the tire (26) is being mounted on the wheel (20).

25 Claims, 5 Drawing Sheets

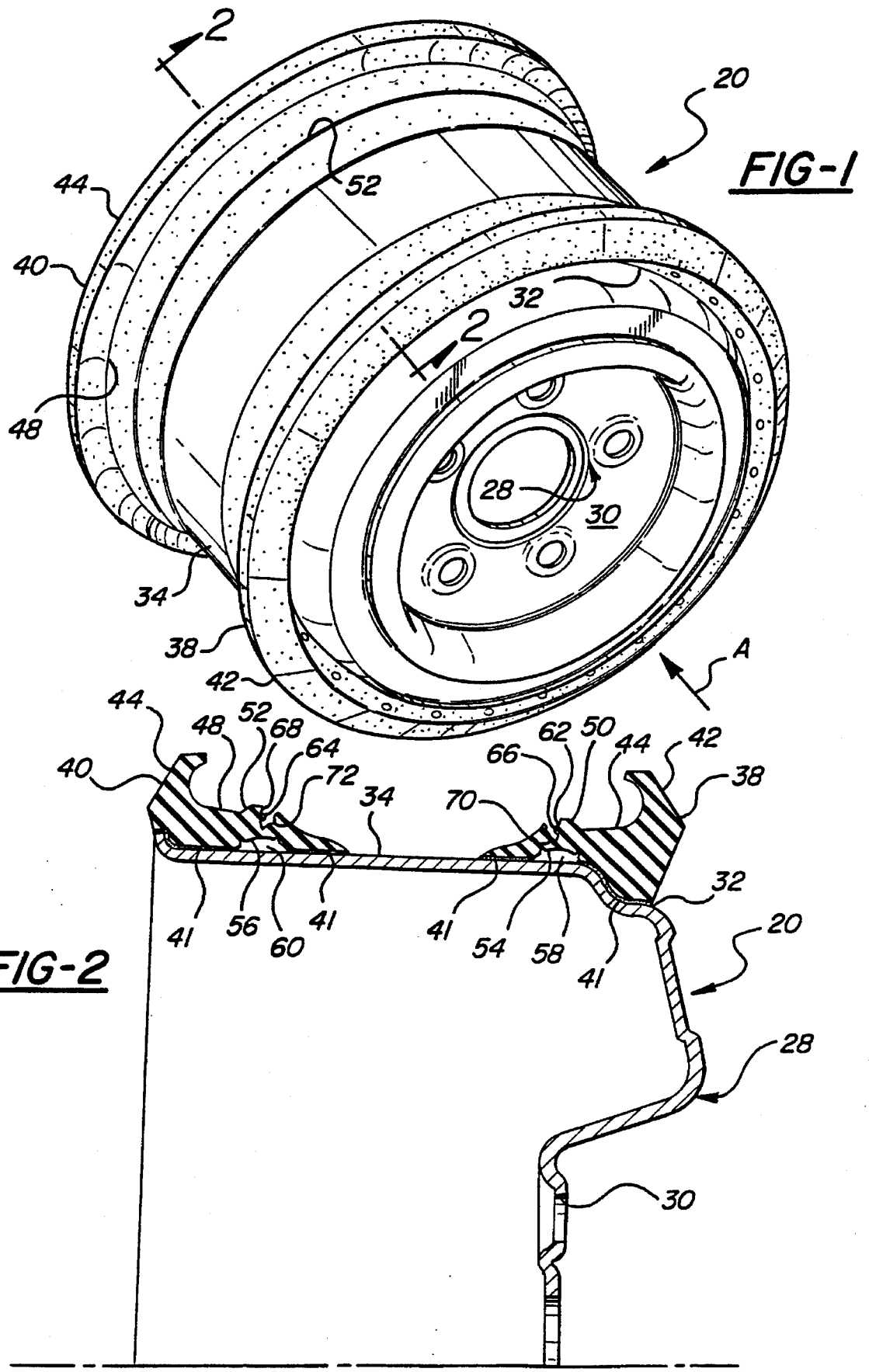

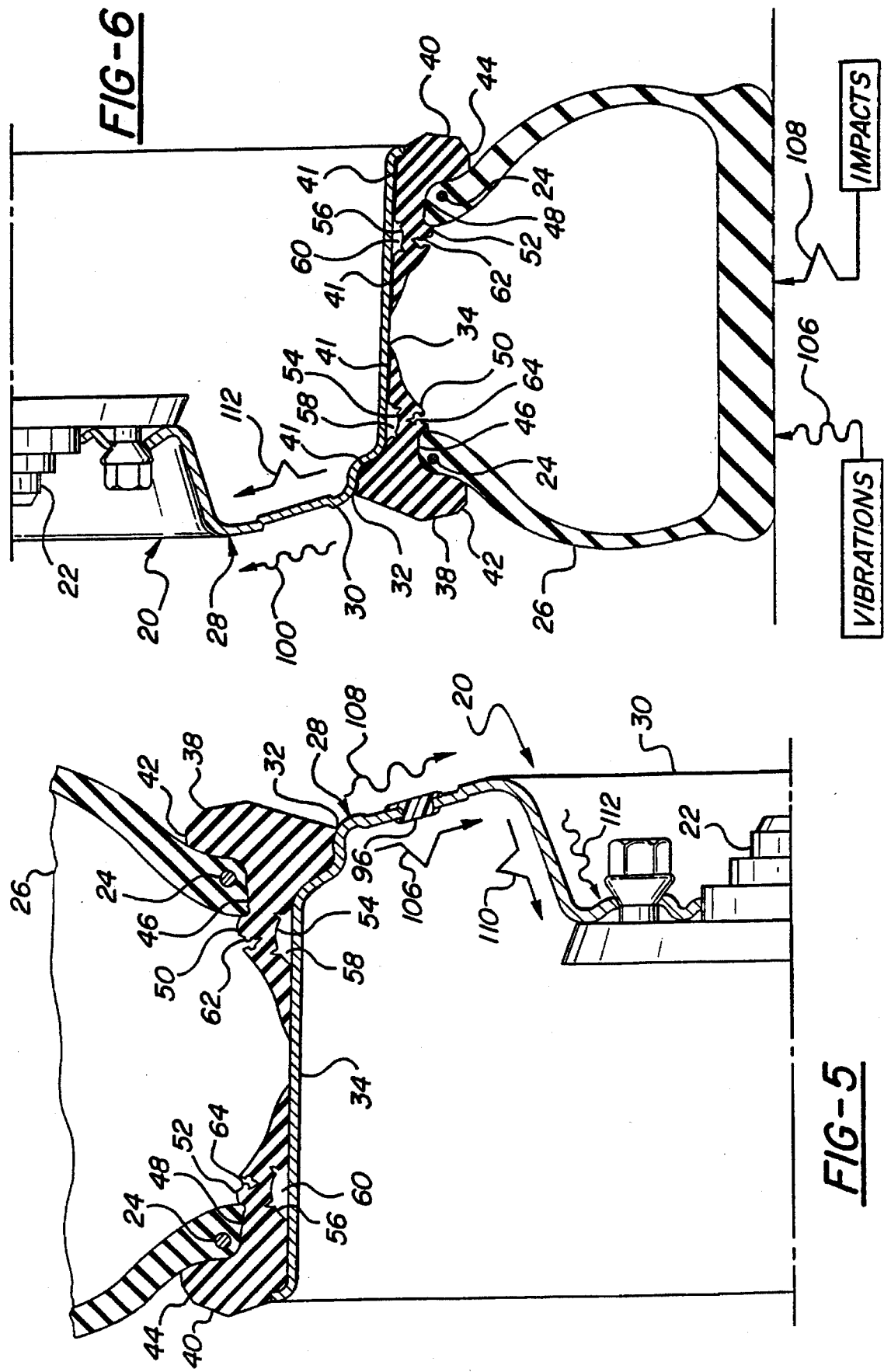

COMPOSITE WHEEL

BACKGROUND OF THE INVENTION

1. Field of the Invention

The invention relates to wheel composites of the type having resiliently compressive components.

2. Description of Related Art

Although the tire and suspension technologies of the automobile have made great strides in recent years, the steel wheel has not had a substantial innovation in close to a century. Performance of the wheel, generally accepted as being poor, has never been the subject of any successful research and development. Advancements in noise attenuation and braking size efficiency have consistently not produced practical answers employable in the steel wheel.

U.S. Pat. No. 5,232,034, issued to Gergele on Aug. 3, 1993, shows a heavy-duty wheel with adaptive tire bead retention members extending around the wheel. The tire bead retention members are used to eliminate the necessity of the multi-part wheel rims without losing brake clearance. The tire bead retention members extend over the existing incompressible flanges to allow the proper mating engagement with tires having a different tire bead profile than that of the wheel. More specifically, the vulcanized rubber tire bead retention members are merely inserts used in conjunction with a wheel so a single wheel may seat two different tire bead profiles. As is disclosed in U.S. Pat. No. 5,232,034, the inserts require the existence of the incompressible flanges to work properly. Additionally, the tire bead retention members do not eliminate the requirement of a well because the tire bead profile is designed to be forced over the incompressible tire bead retention members.

SUMMARY OF THE INVENTION

A composite wheel for beaded pneumatic tires comprises a drum having an elongated skirt of circular cross-section along its axial length, and a tire bead retention member of resiliently compressible material bonded to the outer surface of said skirt for receiving the bead of a tire. The tire bead retention member provide the sole restraint of the tire bead against axial and radial separation from the composite wheel.

The advantages associated with the invention include but are not limited to the elimination of the well which allows for greater brake size and brake heat dissipation. Further, the invention dampens vibrations and impacts or impulses which are received by the tire and transmitted through the wheel and received by the chassis.

BRIEF DESCRIPTION OF THE DRAWINGS

FIG. 1 is a perspective view of a composite wheel according to the preferred embodiment of the invention;

FIG. 2 is a sectional view taken on lines 2—2 of FIG. 1;

FIG. 5 is a sectional view of the composite wheel with a dampening plug and a tire mounted thereon;

FIG. 6 is a sectional side view of the composite wheel with a tire mounted thereon;

DETAILED DESCRIPTION OF THE PREFERRED EMBODIMENT

Figure 3:
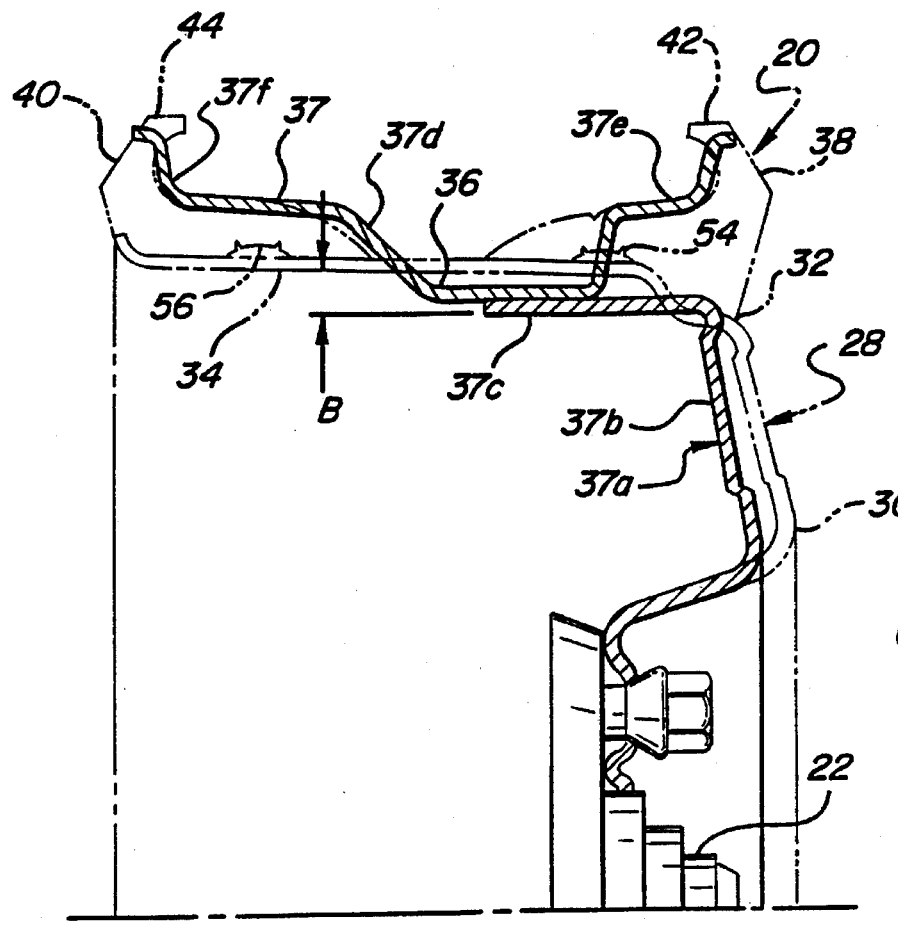
FIG. 3 is a sectional view a prior art wheel shown in solid lines with FIG. 2 shown in phantom lines.

The preferred embodiment of the invention is collectively represented by 20 in the Figures. The invention 20 is a composite wheel. The composite wheel 20 is attachable to a vehicular wheel hub 22 (shown in FIG. 3) and is adapted for receiving two tire beads 24 of a pneumatic tire 26 therebetween. Neither the design of the tire beads 24 nor the tire 26 are a part of the invention and are shown in the Figures generally, as there exists many tire and tire bead designs.

The composite wheel 20 includes a drum, collectively represented by 28 in the Figures. The drum 28 is removably securable to the vehicular wheel hub 22. The drum 28 includes a drum body 30 that defines a circular periphery 32. The drum body 30 does not extend through a single plane. However, the majority of drum body 30 extend through planes which are substantially parallel to each other.

The drum 28 further includes a drum skirt 34. The drum skirt 34 extends substantially perpendicularly out from the drum body 30 along the periphery 32. The drum skirt 34 is substantially cylindrical in shape and, in particular, does not include nor require a well 36 as does the prior art wheel 37 (discussed subsequently and shown in FIG. 3).

As is shown in FIG. 3, the prior art wheel 37 currently is fabricated of steel or aluminum. The prior art wheel 37 include a drum 37a having a drum body 37b and a drum skirt 37c. A tire holding piece 37d is fixedly secured to the drum skirt 37c. The tire holding piece 37d includes two incompressible flanges 37e, 37f which extend out from the well 36 to receive the tire beads therein. The well 36 is necessary to mount the tire 26 onto the wheel 37 because the flanges 37e, 37f are incompressible. Therefore, the tire beads must be positioned inside the well 36 so the remaining portions of the tire beads still outside the flanges 37e, 37f may be forced over the flanges 37e, 37f. The well 36 necessarily reduces the brake size due to limited clearance B which reduces the effectiveness of the brakes.

A tire bead retention member 38 is bonded to the drum skirt 34 and is used to retain the tire bead 24 of the tire 26. The tire bead retention member 38 is bonded to the drum skirt 34 using a glue 41 (see FIG. 2) capable of withstanding the extreme conditions and forces resulting from normal use. The invention 20 utilizes a glue having the trademark Chemlock 234 and can withstand up to 40 tons of adhesive force. The tire bead retention member 38 is resiliently compressible. The tire bead retention member 38 requires a hardness greater than or equal to 60 Shore. The tire bead retention member 38 may be fabricated from an elastomer, elastomer composite, or a plastic.

Because the first tire bead retention member 38 is compressible, it allows the tire beads 24 to pass over the first tire bead retention member 38 when the first tire bead retention member 38 is compressed or deformed. And because the first tire bead retention member 38 is resilient, once the two tire beads 24 pass thereover, the first tire bead retention member 38 returns to its original profile (see FIG. 2).

Although a second tire bead retention member is required, the preferred embodiment of the composite wheel 20 includes a second tire bead retention member 40 which is also resiliently compressible. This allows for the flexibility of mounting a tire 26 on the composite wheel 20 from either direction. Further, the symmetry of the invention aids in balancing the composite wheel 20.

The first 38 and second 40 tire bead retention members each include an upwardly extending flange 42,44 which hold the tire beads 24 in place. Base portion 46,48 are disposed adjacent the upwardly extending flanges 42,44 and support the tire beads 24. The base portion 46,48 is defined by the portion of the tire bead retention members 38,40 which extends between the upwardly extending flanges 42,44 and the anti-roll-off humps 50,52 (discussed subsequently). The tire beads 24 sit on the base portions 46,48 and, once the air pressure in the tire 26 increases, forces each of the upwardly extending flanges 42,44 outwardly creating a seal between the upwardly extending flanges 42,44 and the tire beads 24.

The anti-roll-off humps 50,52 are disposed adjacent the base portions 46,48 and prevent the tire beads 24 from rolling off the base portions 46,48. The anti-roll-off humps 50,52 are formed of the same material as the first 38 and second 40 tire bead retention members and are, therefore, resiliently compressible. The anti-roll-off humps 50,52 are capable of conforming to the size and shape of the tire beads 24 enhancing the sealing capabilities of the first 38 and second 40 tire bead retention members.

The anti-roll-off humps 50,52 include spacing surfaces 54,56. The spacing surfaces 54,56 are located between the anti-roll-off humps 50,52 and the drum skirt 34. The spacing surfaces 54,56 define a space 58,60 and allow the anti-roll-off humps 50,52 to be retracted from an operating position to a retracted position when moving the tire beads 24 over the first 38 and second 40 tire bead retention members.

Figure 4:
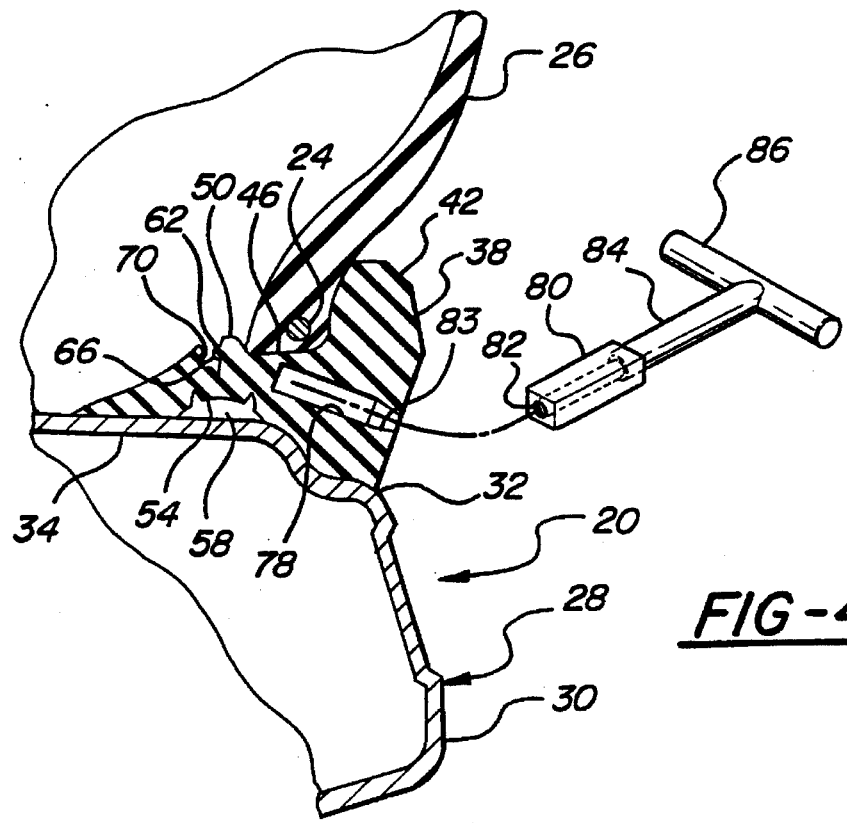
FIG. 4 is a fragmentary sectional view of the composite wheel with a balancing mass and balancing mass tool shown in perspective.
Figure 7A:
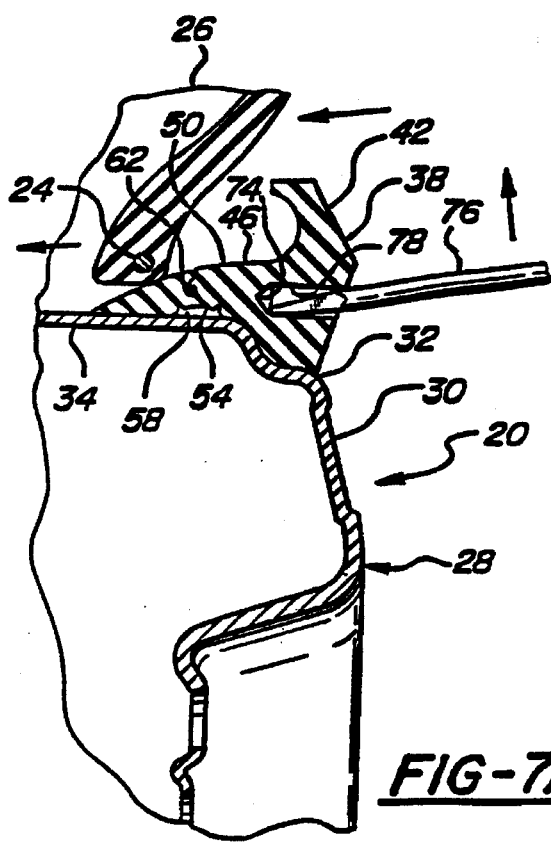
FIGS. 7A and 7B are a sectional views of sequential steps of unlocking the anti-roll-off hump out of the operating position.

Locking interconnectors 62,64 lock the anti-roll-off humps 50,52 in the retracted position (best seen in FIG. 7A). Once the anti-roll-off humps 50,52 are forced or pushed into the retracted position, manually or with the aid of a belt tightener, the tire beads 24 can move onto the base portion 46,48 of the first 38 and second 40 tire bead retention members. In the preferred embodiment, the locking interconnectors 62,64 are a tongue 66,68 and groove 70,72 combination, both of which extend around the periphery 32 of the drum body 30 (best seen in FIG. 4).

Figure 7B:
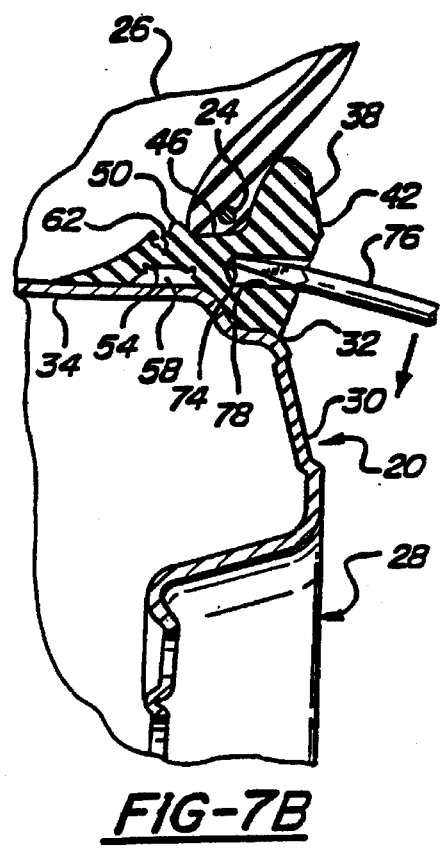

Turning to FIGS. 7A and 7B, the invention 20 further includes unlocking apertures 74 for receiving a tool 76 (a screw driver in the Figures) to lock and unlock the locking interconnectors 62,64 after the tire beads 24 have passed over the anti-roll-off humps 50,52. The unlocking apertures 74 and tool 76 combination are used to lock the tongues 66,68 and grooves 70,72 together (FIG. 7A) to remove the tire bead 24 from the upwardly extending flange 42,44 when dismounting the tire 26. The unlocking apertures 74 and the tool 76 are used to unlock the tongue 66,68 and groove 70,72 when the tire bead 24 is abutting the upwardly extending flange 42,44 (FIG. 7B) to maintain the tire bead 24 in constant contact with the upwardly extending flange 42,44.

Each of the unlocking apertures 74 include a balancing mass portion 78 for receiving a balancing mass 80 therein. The composite wheel 20 includes twenty-four unlocking apertures 74 which are capable of being used to secure balancing masses 80 therein. The balancing mass portions 78 include a holding surface 82 which helps hold the balancing masses 80 therein. A retainer 83 helps keep the balancing mass 80 therein.

Each of the balancing masses 80 includes a threaded hole 82 which receives a balancing mass tool 84 therein. The tool 84 provides a handle 86 when inserting and removing the balancing masses 80 from the balancing mass portions 78.

Figure 8:
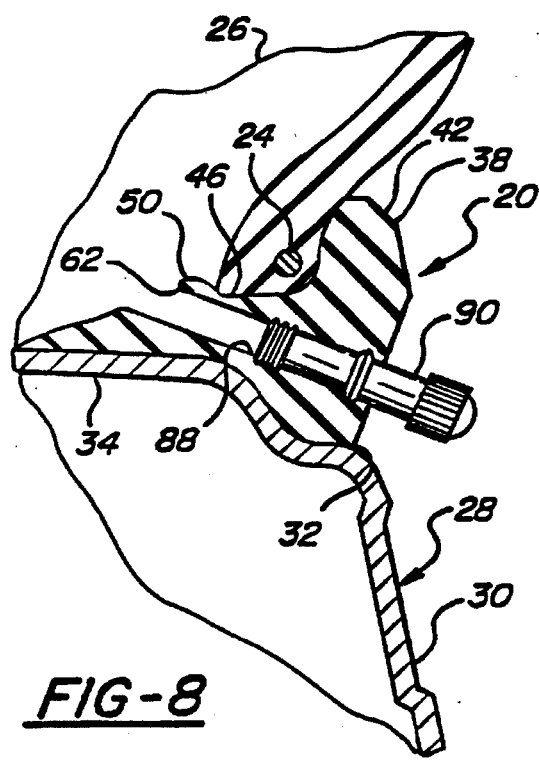
FIG. 8 is a fragmentary sectional view of the composite wheel with a valve.
Figure 9:
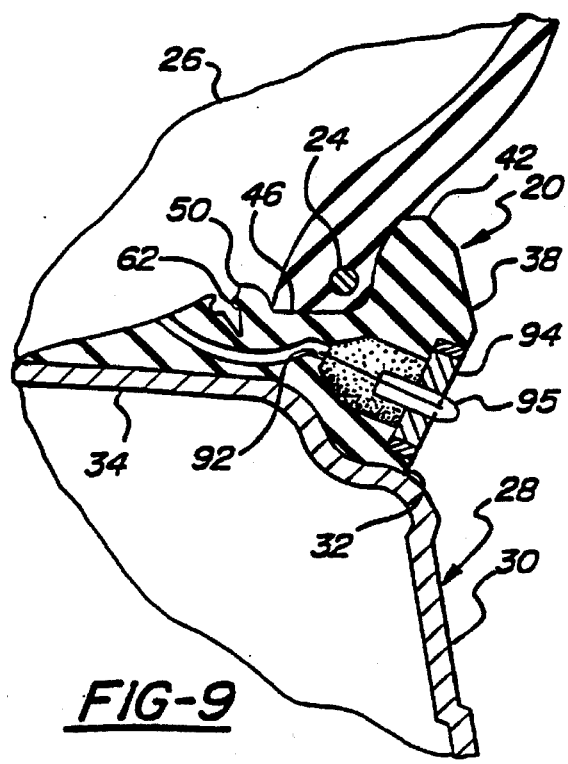
FIG. 9 is a fragmentary sectional view of the composite wheel with a pressure indicator.

The first tire bead retention member 38 further includes a valve hole 88 for receiving a valve 90 therein. The valve hole 88 includes a passageway 92 which allows air to pass between the valve hole 88 and the interior of the tire 26. Although the valve hole 88 extends through the anti-roll-off hump 50,52 in FIG. 8, an alternative would be to have the anti-roll-off hump 50,52 be discontinuous at the valve hole 88.

An indicator hole 92 houses a low pressure indicator 94 therein. The low pressure indicator 94 senses the pressure and indicates, either locally through a light source 95 or remotely into the passenger compartment, that the air pressure in the tire 26 has dropped below an acceptable level. The indicator hole 92 diametrically opposes the valve hole 88 to help balance the composite wheel 20. Also, the indicator hole 92 extends around the anti-roll-off hump 50,52. The valve hole 88 configuration and the indicator hole 92 configuration are interchangeable therebetween.

Figure 10:
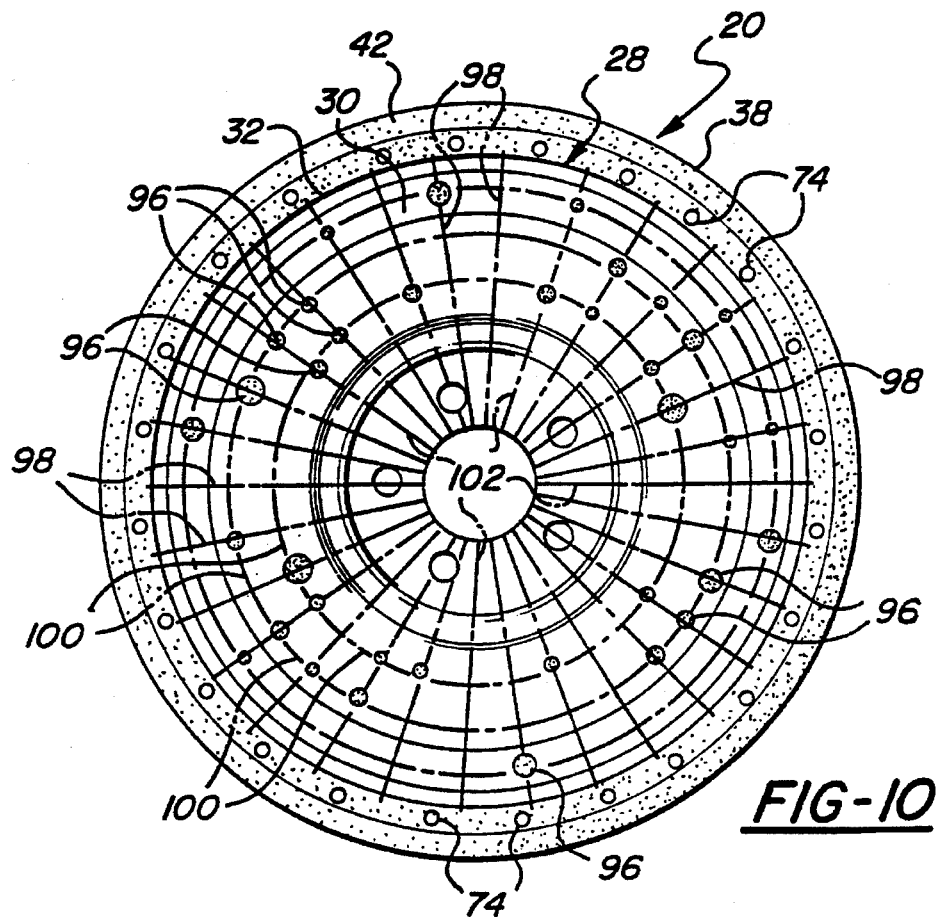
FIG. 10 is a side view of the composite wheel as seen in the direction of arrow A in FIG. 1 with noise attenuating plugs secured thereto.

Throughout the drum body 30, noise attenuating plugs 96 are dispersed. The noise attenuating plugs 96 are received by noise attenuating holes 98 and are bonded therein in the same step as when the tire bead retention members 38,40 are bonded to the drum 28. The noise attenuating plugs 96 are dispersed randomly and are of random size, as may be best seen in FIG. 10 wherein circumferential 100 and radial 102 reference lines are drawn to show the randomization of the noise attenuating plugs 96.

Figure 11:
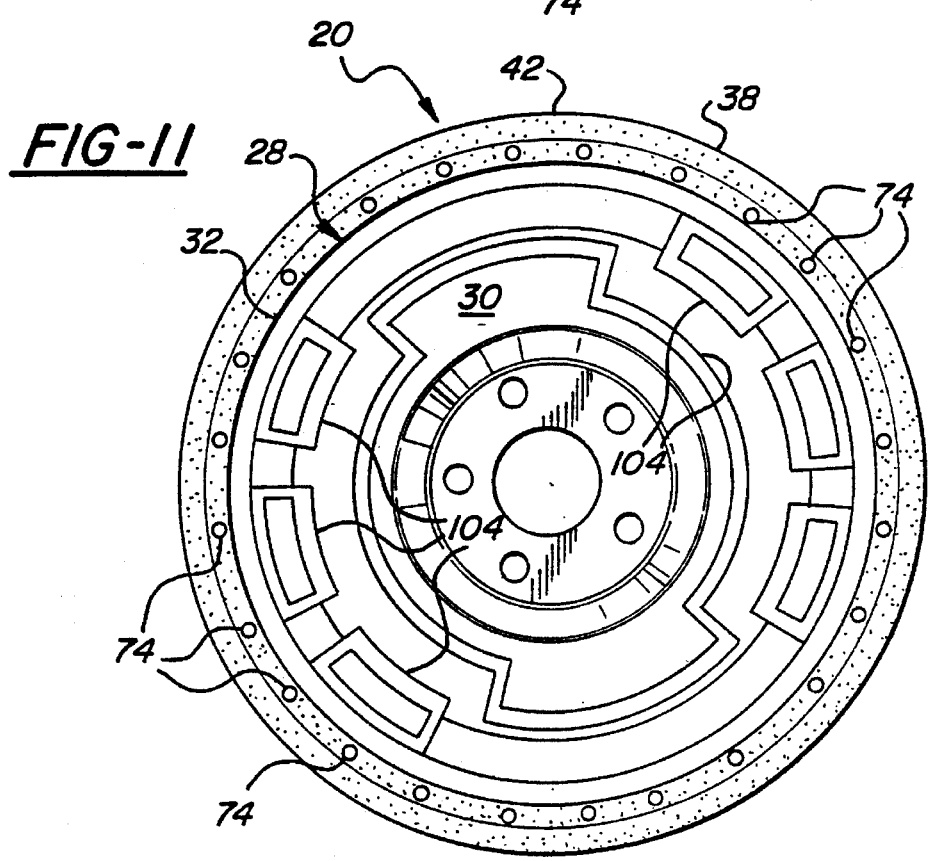
FIG. 11 is a side view of the composite wheel as seen in the direction of arrow A in FIG. 1 with a decorative covering disposed over the noise attenuating plugs.

Turning to FIGS. 5 and 6, the vibrations and impacts, vector representations 106 and 108, respectively, received by the tire 26 are dampened, as is represented by the reduced vibration 110 and impact 112 vector representations, by both the tire bead retention members 38,40 and the noise attenuating plugs 96. The location and size of the noise attenuating plugs 96 optimize the absorption of frequencies of higher than average amplitude resulting in a relatively equal amplitude for all frequencies at or less than half of the peak amplitude which exists in the absence of noise attenuators. As may be seen in FIG. 11, the noise attenuating plugs 96 are covered by aesthetically pleasing covers 104.

In an alternative embodiment, the prior art wheel 37 would include only the anti-roll-off humps 50,52 discussed above. The anti-roll-off humps 50,52 would prevent the tire beads 24 from moving away from the incompressible flanges of the prior art wheel 37 just as effectively as the resiliently compressible flanges 38,40 of the invention 20.

The method for mounting a tire 26 having two tire beads 24 on the wheel 20 include the steps of: placing a portion of two tire beads 24 on the drum skirt 34 between the two resiliently compressible tire bead retention members 38,40; compressing one 38 of the two resiliently compressible tire bead retention members 38,40; moving the remaining portion of the tire beads 24 on the drum skirt 34 between the two resiliently compressible tire bead retention members 38,40; and releasing the compressed tire bead retention member 38 allowing the compressed tire bead retention member 38 to return to its extended position.

The method includes the step of locking the anti-roll-off humps 50,52 in a retracted position prior to moving the remaining portion of the tire beads 24 onto the drum skirt 34. The tire beads 24 are then moved or slid over the anti-roll-off humps 50,52 onto the base portion 46,48 adjacent the upwardly extending flanges 42,44.

The anti-roll-off humps 50,52 are then unlocked such that the anti-roll-off humps 50,52 return to their extended positions inhibiting the tire beads 24 from moving away from the resiliently compressible tire bead retention members 38,40.

The method for fabricating a composite wheel 20 include the steps of pressing sheet metal into a substantially cylindrical drum. Glue 41 is applied to the bottom surface of a tire bead retention member or flange 38,40. The tire bead retention member 38,40 is then positioned on the drum skirt 34 such that the glue 41 is contacting the tire bead retention member 38,40 and the drum skirt 34. The composite wheel 20 is then cured to cure the glue 41 insuring the tire bead retention member 38,40 does not separate from the drum 30.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A composite wheel for a pneumatic tire including a tire bead, said composite wheel comprising:

a drum defining an axial length and having an elongated skirt defining a circular cross-section along said axial length; and a tire bead retention member being resiliently compressible, said tire bead retention member bonded to said elongated skirt such that said tire bead retention member positions the bead of the pneumatic tire outside said circular cross-section and provides the sole restraint of the bead against axial and radial separation from said composite wheel.

2. A composite wheel as claimed in claim 1 further characterized by a second tire bead retention member of resiliently compressible material bonded to the outer surface of said skirt at a spaced location from said first named tire bead retention member for receiving a second bead of the tire and providing the sole restraint of the second bead against axial and radial separation from said composite wheel.

3. A composite wheel as claimed in claim 2 further characterized by each of said first and second tire bead retention members including a base portion for supporting the tire beads thereon.

4. A composite wheel as claimed in claim 3 further characterized by said first and second tire bead retention members further including anti-roll-off humps disposed adjacent said base portions to prevent the tire beads from rolling off said base portions, said anti-roll-off humps including an operating position and a retracted position.

5. A composite wheel as claimed in claim 4 further characterized by said anti-roll-off humps including a spacing surface allowing said anti-roll-off humps to move between said operating position and said retracted position, said anti-roll-off humps being in said retracted position when moving the tire beads over said first and second tire bead retention members.

6. A composite wheel as claimed in claim 5 further characterized by a locking interconnector for locking said anti-roll-off humps in said retracted position.

7. A composite wheel as claimed in claim 6 further characterized by unlocking apertures for receiving a tool to unlock said locking interconnector after the tire beads have passed over said anti-roll-off humps.

8. A composite wheel as claimed in claim 7 further characterized by each of said unlocking apertures including a balancing mass portion for receiving a balancing mass therein.

9. A composite wheel as claimed in claim 8 further characterized by said first tire bead retention member further including a valve hole for receiving a valve therein.

10. A composite wheel as claimed in claim 9 further characterized by said first tire bead retention member including an indicator hole to receive a low pressure indicator therein.

11. A composite wheel as claimed in claim 10 further characterized by said noise attenuating plugs dispersed throughout said drum body.

12. A composite wheel as claimed in claim 11 further characterized by said drum body including noise attenuating holes for fixedly securing said noise attenuating plugs therein.

13. A composite wheel attachable to a vehicular wheel hub and adapted for receiving two tire beads of a pneumatic tire, said composite wheel comprising a drum having an elongate skirt and a pair of tire bead retention members spaced along the outer surface of said skirt for receiving the beads of a tire; and anti-roll-off humps disposed a predetermined distance from said tire bead retention members to prevent the tire beads from rolling away from said tire bead retention members, said anti-roll-off humps being resiliently compressible between an operating position and a retracted position.

14. A composite wheel as claimed in claim 13 further characterized by said anti-roll-off humps including a spacing surface allowing said anti-roll-off humps to be retracted from said operating position to said retracted position when moving the tire beads to abut said first and second tire bead retention members.

15. A composite wheel as claimed in claim 14 further characterized by a locking interconnector for locking said anti-roll-off humps in said retracted position.

16. A tire bead retention member comprising:

an upwardly extending flange for retaining a tire bead thereagainst;

a base portion for receiving the tire bead rim thereon;

an anti-roll-off hump disposed adjacent said base portion to prevent the tire bead from rolling off said base portion, said anti-roll-off hump including a spacing surface allowing said anti-roll-off hump to be retracted from an operating position to a retracted position when moving the tire bead over said tire bead retention member; and a locking interconnector for locking said anti-roll-off hump in said retracted position.

17. A tire bead retention member as claimed in claim 16 further characterized by unlocking apertures for receiving a tool to unlock said locking interconnector after the tire bead have passed over said anti-roll-off hump.

18. A tire bead retention member as claimed in claim 17 further characterized by each of said unlocking apertures including a balancing mass portion for receiving a balancing mass therein.

19. A tire bead retention member as claimed in claim 18 further characterized by a valve hole for receiving a valve therein.

20. A method for mounting a tire having two tire beads on a composite wheel wherein the composite wheel includes a drum body, drum skirt and a tire bead retention member and a resiliently compressible tire bead retention member with an anti-roll-off hump extending out from the drum skirt, the method comprising the steps of:

placing a portion of two tire beads on a drum skirt between the tire bead retention member and the resiliently compressible tire bead retention member;

applying a compressing force to the resiliently compressible tire bead retention member to compress the resiliently compressible tire bead retention member from an extended position to a compressed position;

moving the remaining portion of the tire beads on the drum skirt over the compressed resiliently compressible tire bead retention member between the two tire bead retention members; and releasing the compressing force on the resiliently compressible tire bead retention member allowing the resiliently compressible tire bead retention member to return to the extended position.

21. The method of claim 20 further characterized by locking anti-roll-off humps in a retracted position prior to moving the remaining portion of the tire beads on the drum skirt.

22. The method of claim 21 further characterized by moving the tire beads to a position disposed adjacent the resiliently compressible tire bead retention members.

23. The method of claim 22 further characterized by unlocking the anti-roll-off humps to move the anti-roll-off humps to an operating position inhibiting the tire beads from moving away from the resiliently compressible tire bead retention members.

24. A method for fabricating a composite wheel, the method comprising the steps of:

pressing sheet metal into a substantially cylindrical drum;

applying glue to a bottom surface of a tire bead retention member;

positioning the tire bead retention member on the drum skirt such that the glue is contacting the tire bead retention member and the drum skirt; and curing the glue to bond the tire bead retention member to the drum skirt.

25. The method of claim 24 further characterized by gluing a bottom surface of a second tire bead retention member and positioning the second tire bead retention member on the drum skirt prior to curing the glue.

* * * * *